United States Patent
Joubran et al.

(10) Patent No.: US 12,308,134 B1
(45) Date of Patent: May 20, 2025

(54) ATOMIC BATTERY FOR WELLBORE OPERATION

(71) Applicant: Halliburton Energy Services, Inc., Houston, TX (US)

(72) Inventors: Jonathon N. Joubran, Houston, TX (US); Glen P. Breerwood, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/600,366

(22) Filed: Mar. 8, 2024

(51) Int. Cl.
*E21B 23/00* (2006.01)
*G21H 1/00* (2006.01)
*G21H 1/06* (2006.01)
*H02J 7/34* (2006.01)

(52) U.S. Cl.
CPC ............... *G21H 1/06* (2013.01); *H02J 7/342* (2020.01); *E21B 23/00* (2013.01)

(58) Field of Classification Search
CPC ........ E21B 23/00; E21B 34/066; E21B 47/00; H02J 7/342; G21H 1/00
See application file for complete search history.

(56) References Cited

U.S. PATENT DOCUMENTS

| | | | | |
|---|---|---|---|---|
| 3,405,387 A | * | 10/1968 | Koomey | E21B 41/0085 367/133 |
| 4,805,407 A | * | 2/1989 | Buchanan | E21B 41/0085 60/644.1 |
| 8,668,008 B2 | * | 3/2014 | Rytlewski | G21H 1/02 166/250.01 |
| 9,127,532 B2 | | 9/2015 | Maida et al. | |
| 9,318,680 B2 | * | 4/2016 | Tosi | H10N 10/10 |
| 11,352,875 B2 | * | 6/2022 | Taylor | E21B 47/14 |
| 2004/0265682 A1 | | 12/2004 | Hudson et al. | |
| 2006/0204795 A1 | * | 9/2006 | Schulman | H01M 10/46 429/5 |
| 2012/0305241 A1 | | 12/2012 | Rytlewski et al. | |
| 2013/0026978 A1 | * | 1/2013 | Cooley | H01M 10/052 307/43 |
| 2020/0392837 A1 | | 12/2020 | Taylor et al. | |
| 2023/0184102 A1 | | 6/2023 | Fripp et al. | |

OTHER PUBLICATIONS

PCT/US2024/021613, "International Search Report and Written Opinion", Nov. 29, 2024, 10 pages.

* cited by examiner

*Primary Examiner* — Matthew R Buck
(74) *Attorney, Agent, or Firm* — Kilpatrick Townsend & Stockton, LLP

(57) ABSTRACT

A system can include one or more wellbore tools, a pressure-containment housing, and an atomic battery. The one or more wellbore tools can be positioned in a wellbore to perform one or more wellbore operations. The pressure-containment housing can be positioned in the wellbore. The atomic battery can be positioned in the pressure-containment housing and can be coupled with the one or more wellbore tools to provide continuous electrical power to the one or more wellbore tools to facilitate the one or more wellbore operations.

17 Claims, 4 Drawing Sheets

ATOMIC BATTERY FOR WELLBORE OPERATION

TECHNICAL FIELD

The present disclosure relates generally to wellbore operations and, more particularly (although not necessarily exclusively), to an atomic battery that can be used to provide electrical power for a wellbore operation.

BACKGROUND

Wellbore operations may include various equipment, components, methods, or techniques to perform various tasks with respect to a wellbore. In some examples, the wellbore operations may use power, such as electricity, to operate one or more wellbore tools for performing the wellbore operations. In some examples, the wellbore tools can be or include sensors, valves, and the like. The wellbore tools can use control lines to provide electricity, telemetry, hydraulic pressure, and the like. But, the control lines may occupy an excessive amount of space in the wellbore, may use excessive amounts of resources, and the like.

DETAILED DESCRIPTION

Figure 1:
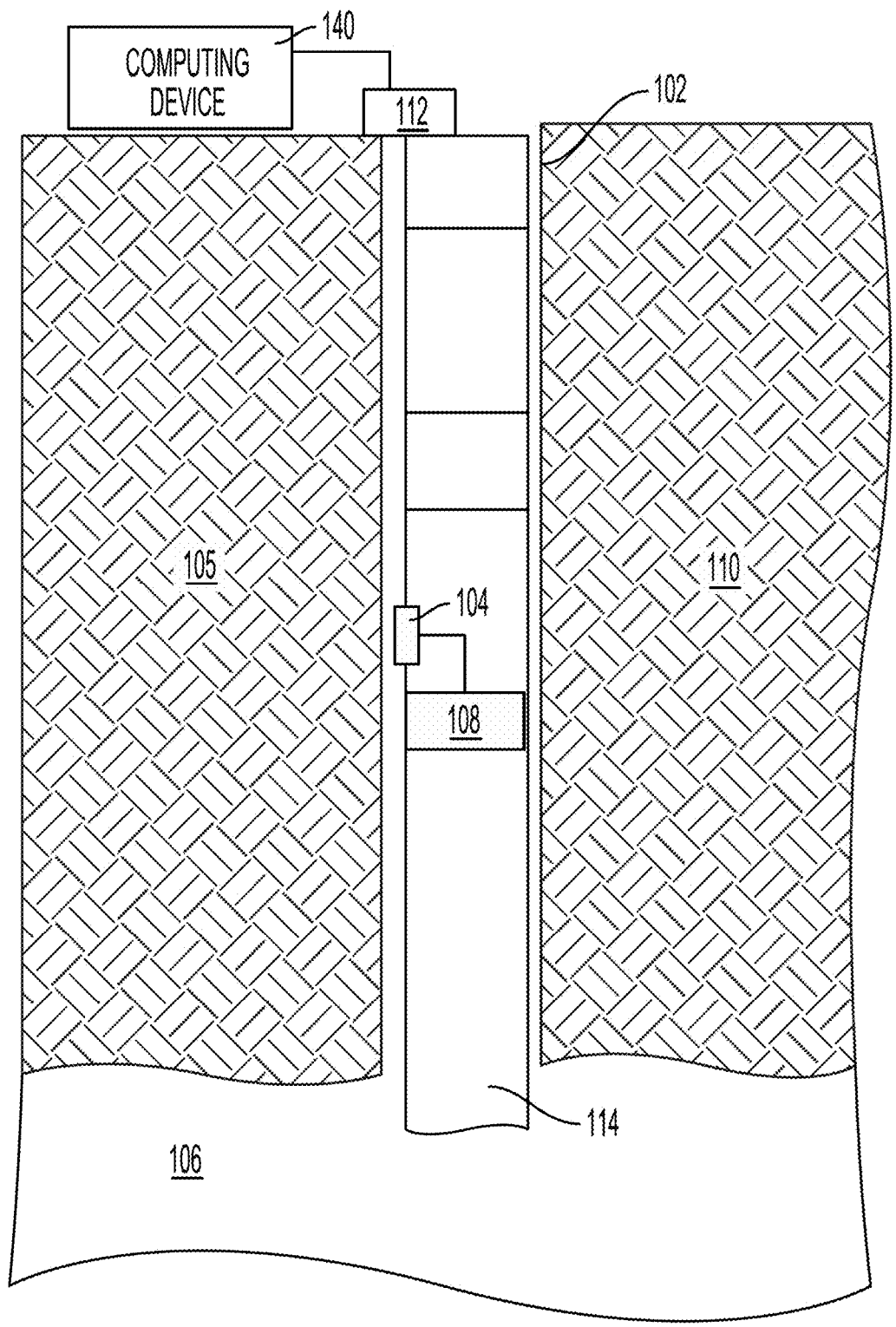
FIG. 1 is a diagram of a wellbore that can use an atomic battery to provide power for one or more wellbore operations according to one example of the present disclosure.

Certain aspects and examples of the present disclosure relate to an atomic battery that can be used to facilitate one or more wellbore operations with respect to a wellbore. The one or more wellbore operations can be or include a wellbore drilling operation, a wellbore completion operation, a wellbore stimulation operation, a wellbore production operation, a wellbore abandonment operation, any other suitable wellbore operation, or any combination thereof. The one or more wellbore operations may involve using one or more wellbore tools such as a sensor or gauge, a valve, a setting device, other suitable wellbore tools, or any combination thereof. The one or more wellbore tools may use electrical power, such as electricity, to perform the one or more wellbore operations. For example, and with respect to a completion operation, the one or more wellbore tools may include a pressure sensor, a temperature sensor, or a combination thereof, which may use electrical power to monitor pressure, to monitor temperature, or to monitor a combination thereof in the wellbore. The atomic battery can be coupled, for example directly or indirectly, to the one or more wellbore tools to provide electrical power to the one or more wellbore tools. The atomic battery may be or include an ultra-long-lasting (e.g., more than 10 years) battery that can continuously operate without being recharged. In some examples, the atomic battery can be or include a nuclear battery, a radioisotope battery, and the like.

Wireless wellbore tools may include wireless completion devices such as sensors and actuators. The wireless completion devices can be used to control injection fluids, to control produced fluids, to control associated telemetry communication to and from a surface of a wellbore, and the like. The wireless nature of the wellbore tools can allow one or more control lines to be removed from the wellbore systems, or can allow the wellbore systems to function without installing the one or more control lines. Removing or not using the control lines for wellbore systems, such as intelligent completion systems, can reduce an amount of resources used in the wellbore systems, can reduce risks associated with forming or operating the wellbore systems, and the like. Battery technology can be used to facilitate using the wireless wellbore tools. But, other systems do not use batteries that (i) allow for long term use of wireless devices or (ii) the batteries may limit scenarios of use of the wireless wellbore tools.

An atomic battery can be used to allow the wireless devices to be used long-term and at a full potential. As used herein, "atomic battery" includes any suitable type of battery that can provide continuous electrical power for an extended period of time, which may be predetermined. The extended period of time may be approximately five years, approximately 10 years, approximately 15 years, approximately 20 years, approximately 25 years, approximately 30 years, approximately 35 years, approximately 40 years, approximately 45 years, approximately 50 years, or more than approximately 50 years. In some examples, "approximately" may imply a range of about 1% larger or smaller, about 2% larger or smaller, about 3% larger or smaller, about 4% larger or smaller, about 5% larger or smaller, or about 10% larger or smaller than the value applied thereto. In a particular example, approximately 20 years may include a range of about 18 years to about 22 years, though other suitable examples are possible. During the extended period of time, the atomic battery may not need to be recharged to provide the continuous electrical power. Some examples of an atomic battery can include a nuclear battery, a radioisotope battery, a radioisotope generator, or any combination thereof. In a particular example, the atomic battery can be or include a radioisotope battery that includes tritium, Nickel-63, or a combination thereof. In other examples, the atomic battery may be or include a thermal atomic battery or a non-thermal atomic battery.

In some examples, the atomic battery can be or include a device that can provide electrical power via decay of a radioactive isotope, which can generate free energy. The atomic battery can use the free energy to generate electrical power such as electricity. In some examples, the atomic battery may generate the electrical power from nuclear energy, but the atomic battery may not use a nuclear chain reaction to generate the free energy or the electrical power. The atomic battery may have an extremely long life, such as exceeding 20 years, and the atomic battery can have a high energy density. The atomic battery can be used for wellbore operations, such as completion operations, etc., that operate for extended periods of time unattended. Additionally, the atomic battery can be used as a power source for other operations or equipment that operate unattended for long periods of time. Examples of the other operations or equipment can include spacecraft, pacemakers, underwater systems (e.g., offshore rigs), automated stations in remote or difficult-to-access parts of the world, such as the North Pole or *Antarctica*, and the like.

The atomic battery can be used in various wellbore operations. For example, the atomic battery can be used to provide continuous electrical power for environmental monitoring operations, fluid property monitoring operations, actuation operations, and the like. The environmental operations can involve monitoring a pressure, a temperature, vibrations, and the like in a wellbore. The environmental operations can be performed by environmental sensors that can be provided with electrical power by the atomic battery. The fluid property monitoring operations can involve monitoring a composition of fluid in the wellbore, a viscosity of fluid in the wellbore, a velocity of fluid in the wellbore, and the like. The fluid property monitoring operations can be performed by fluid property sensors or gauges that can be provided with electrical power by the atomic battery. The actuation operations can involve fluid injection or production control, gas lift injection, packer setting or releasing, and the like. The actuation operations can be performed by fluid control valves (e.g., inflow control valves, injection valves, etc.), a gas lift valve, a setting device, a release device, and the like that can be provided with electrical power by the atomic battery.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a diagram of a wellbore 102 that can use an atomic battery 104 to provide power for one or more wellbore operations involving the wellbore 102 according to one example of the present disclosure. The wellbore 102 can be positioned or otherwise formed in a subterranean formation 105. In some examples, a reservoir 106 may be located in, or proximate to, the subterranean formation 105, and the reservoir 106 may be subjected to a production operation or other suitable operations via the wellbore 102.

A wellbore tool 108 can be positioned in the wellbore 102 to perform one or more wellbore operations with respect to the wellbore 102. For example, the wellbore tool 108 can include an environmental monitoring tool, a fluid property monitoring tool, an actuation tool, other suitable types of wellbore tools, or any combination thereof. The environmental monitoring tool can be or include a pressure sensor or gauge, a temperature sensor or gauge, a vibration sensor or gauge, or any other suitable wellbore tool that can be used to monitor environmental conditions, such as a pressure, a temperature, vibrations, and the like, relating to the wellbore 102. The fluid property monitoring tool can be or include a viscosity sensor or gauge, a fluid velocity sensor or gauge, a fluid composition sensor or gauge, an acoustic device (e.g., a fluidic oscillator), or any other suitable wellbore tool that can be used to monitor one or more properties of fluid in the wellbore 102. The actuation tool may be or include a setting device, a releasing device, a valve, or any other suitable wellbore tool that can be used to control flow with respect to the wellbore 102.

The wellbore tool 108 may be coupled with the atomic battery 104. For example, The atomic battery 104 may be connected to the wellbore tool 108 with one or more wires or cables that can transmit electrical power such as electricity. In other examples, the atomic battery 104 may be wirelessly coupled with the wellbore tool 108 in which the wireless coupling allows electrical power to be transferred from the atomic battery 104 to the wellbore tool 108. Additionally or alternatively, the atomic battery 104 can be positioned in a pressure-containment housing to provide protection to the atomic battery 104 while in operation in the wellbore 102.

The atomic battery 104 can provide continuous electrical power to the wellbore tool 108 for an extended period of time, which may exceed an expected lifetime of the wellbore 102. In some examples, the extended period of time may be approximately five years, approximately 10 years, approximately 15 years, approximately 20 years, approximately 25 years, approximately 30 years, approximately 35 years, approximately 40 years, approximately 45 years, approximately 50 years, or more than approximately 50 years. During the extended period of time, the atomic battery 104 may not need to be recharged to provide the continuous electrical power.

Some examples of an atomic battery can include a nuclear battery, a radioisotope battery, a radioisotope generator, or any combination thereof. In a particular example, the atomic battery can be or include a radioisotope battery that includes tritium, Nickel-63, or a combination thereof. In other examples, the atomic battery may be or include a thermal atomic battery or a non-thermal atomic battery.

In some examples, a computing device 140 can be positioned at a surface 110 of subterranean formation 105. Additionally or alternatively, a metering and flow control device 112 can be positioned at the surface 110 of the subterranean formation 105. The metering and flow control device 112 may be connected to the computing device 140 to allow one or more wellbore operations with respect to the wellbore 102 to be performed. In other examples, a different device other than the metering and flow control device 112 can be used.

In some examples, a production tubing string 114 can be positioned in the wellbore 102. Other strings, such as work string, a drill string, and the like, can be positioned in the wellbore 102 in other examples. The production tubing string 114 can be used to facilitate production such as from the reservoir 106, from the subterranean formation 105, or from other suitable sources. The production tubing string 114 can additionally or alternatively facilitate other operations, such as monitoring operations, actuation operations, and the like, that can be performed by the wellbore tool 108. In a particular example, the production tubing string 114 may be coupled with the wellbore tool 108 that can be or include an environmental monitoring sensor or gauge, and the wellbore tool 108 can perform an environmental monitoring operations, for example using electrical power provided by the atomic battery 104, while positioned on the production tubing string 114.

Figure 2:
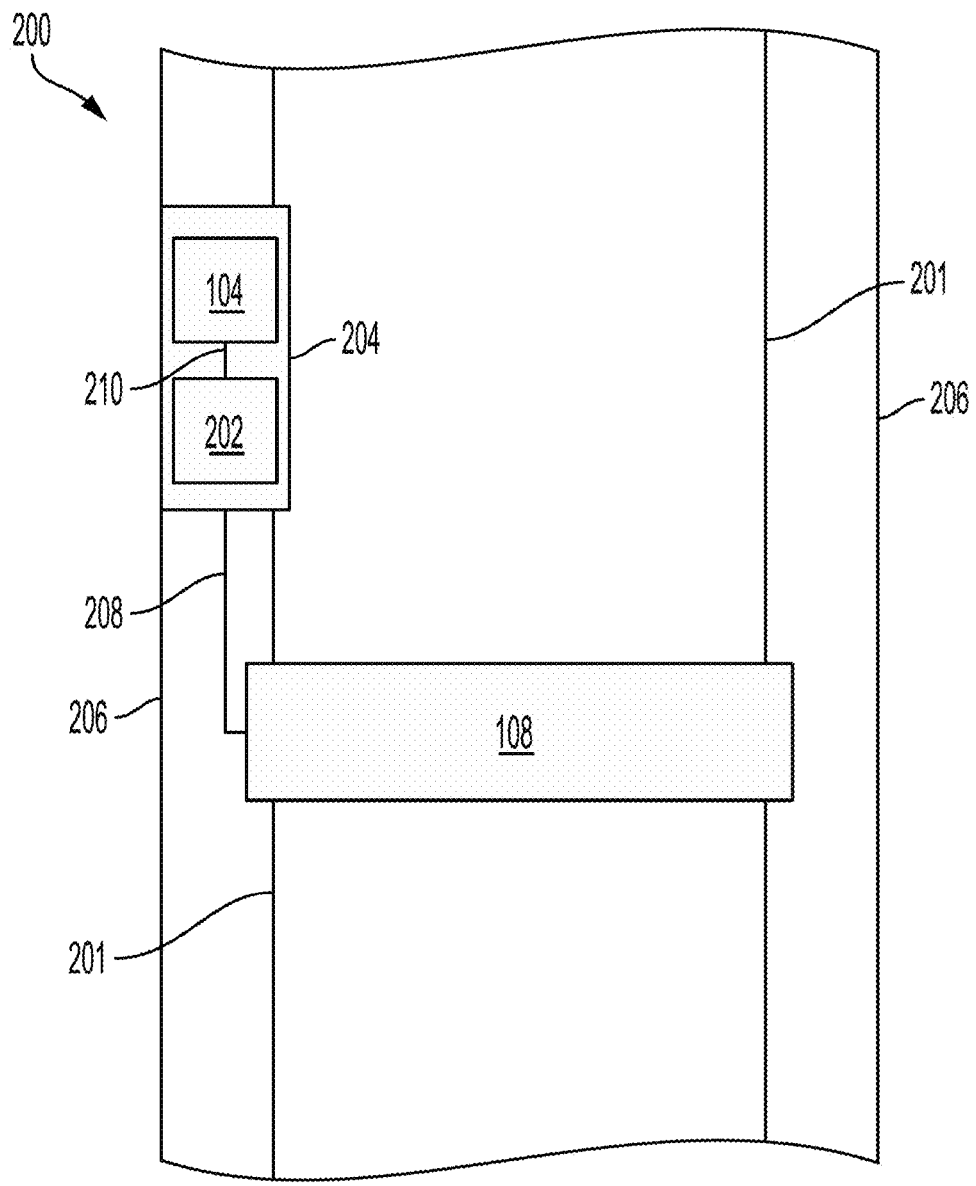
FIG. 2 is a diagram of a wellbore environment that can include an atomic battery and a rechargeable battery according to one example of the present disclosure.

FIG. 2 is a diagram of a wellbore environment 200 that can include an atomic battery 104 and a rechargeable battery 202 according to one example of the present disclosure. In some examples, the wellbore environment 200 may be or include a subset of an environment associated with the wellbore 102, though other suitable wellbores, environments, and the like are possible. As illustrated in FIG. 2, the wellbore environment 200 can include a tubing 201, the wellbore tool 108, and a pressure-containment housing 204 that can include the atomic battery 104 and the rechargeable battery 202. In some examples, such as examples in which the rechargeable battery 202 is not used or in which the atomic battery 104 is used to directly power the wellbore tool 108, the pressure-containment housing 204 may not include the rechargeable battery 202. For example, the pressure-containment housing 204 may include more than one (e.g., two, three, four, five, or more than five) atomic battery coupled in series, in parallel, or in a combination thereof with one another to provide power to the wellbore tool 108.

The tubing 201 may be positioned in a wellbore that can include or that can otherwise define wellbore wall 206. In some examples, the tubing 201 can be or include a completion tubing string, a production tubing string, and the like. The tubing 201 can be coupled with or otherwise facilitate downhole positioning of the wellbore tool 108. For example, the wellbore tool 108 can be attached to or otherwise positioned on the tubing 201, and the tubing 201 can be positioned in the wellbore.

Additionally or alternatively, the pressure-containment housing 204 can be coupled with or otherwise positioned on the tubing 201. The pressure-containment housing 204 can be offset, for example axially or radially, from the wellbore tool 108, and the pressure-containment housing 204 can be positioned proximate to the wellbore tool 108 to allow electrical communication between the atomic battery 104 or the rechargeable battery 202 and the wellbore tool 108. For example, electrical cable 208 can be used to convey electrical power between the rechargeable battery 202 and the wellbore tool 108. In other examples, the electrical cable 208 may connect the atomic battery 104 with the wellbore tool 108 to directly provide power from the atomic battery 104 to the wellbore tool 108, to a capacitor, or to a combination thereof.

In some examples, the atomic battery 104 may be electrically coupled with the rechargeable battery 202. As illustrated in FIG. 2, a second electrical cable 210 electrically couples the atomic battery 104 with the rechargeable battery 202. In other examples, the atomic battery 104 may be in wireless electrical communication with the rechargeable battery 202. For example, the atomic battery 104 may be used to provide electrical power to the rechargeable battery 202 without using electrical cables. Additionally or alternatively, the atomic battery 104 can be used to provide a trickle charge for the rechargeable battery 202. For example, the rechargeable battery 202 may be or include an electrochemical battery that may be turned on and off periodically over the life of the wellbore to facilitate one or more operations performed with respect to the wellbore. The electrochemical battery may be or include a lead-acid-based battery, a lithium-based battery, or the like. While the rechargeable battery is off, or, in some example, continuously, the atomic battery 104 may generate small amounts (e.g., having less than one ampere of current) of electrical power and can provide the small amounts of electrical power to the rechargeable battery 202 to prevent the rechargeable battery 202 from losing a threshold amount of charge. The threshold amount of charge may be the minimum charge necessary for powering the one or more wellbore operations, and the atomic battery 104 may provide enough of a trickle charge to keep the rechargeable battery 202 above the threshold charge for the life of the wellbore.

In some examples, the atomic battery 104, the wellbore tool 108, a system including the atomic battery 104 and the wellbore tool 108, or the like can include electrical equipment. The electrical equipment may couple the atomic battery 104 with the wellbore tool 108. For example, the electrical equipment may be or include a circuit including the atomic battery 104 and the wellbore tool 108, may be or include electrical cables or conduits connecting the atomic battery 104 and the wellbore tool 108, may be or include internal electrical components of the atomic battery 104 or the wellbore tool 108, or the like. The electrical equipment may consume negligible amounts of electrical power. In some examples, negligible amounts of power may include amounts of current below approximately 500 nanoamps, below approximately 250 nanoamps, below approximately 100 nanoamps, and the like. In other examples, negligible amounts of power may include amounts of power below approximately 500 nanowatts, below approximately 250 nanowatts, below approximately 100 nanowatts, and the like.

Figure 3:
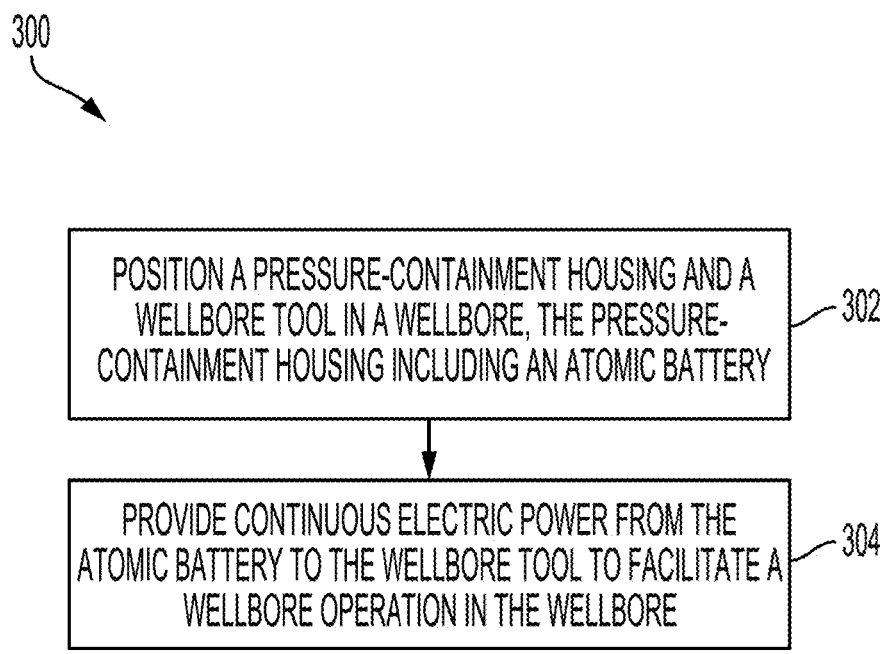
FIG. 3 is a flowchart of a process to install and use an atomic battery in a wellbore for one or more wellbore operations according to one example of the present disclosure.

FIG. 3 is a flowchart of a process 300 to install and use an atomic battery 104 in a wellbore 102 for one or more wellbore operations according to one example of the present disclosure. At block 302, a pressure-containment housing, such as the pressure-containment housing 204, and a wellbore tool 108 are positioned downhole in a wellbore 102. The pressure-containment housing, the wellbore tool 108, or a combination thereof can be positioned in the wellbore 102 using a tubing 201 or via other suitable devices or techniques. In some examples, the pressure-containment housing may include an atomic battery 104. Additionally or alternatively, the pressure-containment housing may include additional or other suitable components such as one or more electrical cables, a rechargeable battery 202, etc. In a particular example, the pressure-containment housing, the wellbore tool 108, or a combination thereof can be coupled with, such as mechanically attached to, the tubing 201, and the tubing 201 can be positioned in the wellbore 102 using a winch, a crane, or other suitable device for lowering the tubing 201 into the wellbore.

Once the tubing 201 is positioned in the wellbore 102, the wellbore tool 108 may perform one or more wellbore operations. In some examples, the one or more wellbore operations can include one or more environmental monitoring operations, one or more fluid property monitoring operations, one or more actuation operations, and the like. The one or more environmental operations can involve monitoring a pressure, a temperature, vibrations, and the like in or around a wellbore 102. In some examples, the one or more environmental operations can be performed by one or more environmental sensors. The one or more fluid property monitoring operations can involve monitoring a composition of fluid in the wellbore 102, a viscosity of fluid in the wellbore 102, a velocity of fluid in the wellbore 102, and the like. The one or more fluid property monitoring operations can be performed by one or more fluid property sensors or gauges. The one or more actuation operations can involve fluid injection or production control, gas lift injection, packer setting or releasing, and the like. The one or more actuation operations can be performed by fluid control valves (e.g., inflow control valves, injection valves, etc.), a gas lift valve, a setting device, a release device, and the like.

At block 304, continuous electrical power is provided to the wellbore tool 108 by the atomic battery 104. The atomic battery 104 may provide continuous electrical power for an extended period of time, which may be predetermined and may exceed the expected lifetime of the wellbore 102. In some examples, the extended period of time may be approximately five years, approximately 10 years, approximately 15 years, approximately 20 years, approximately 25 years, approximately 30 years, approximately 35 years, approximately 40 years, approximately 45 years, approximately 50 years, or more than approximately 50 years. During the extended period of time, the wellbore tool 108 can receive the continuous electrical power from the atomic battery 104, and the wellbore tool 108 can use the continuous electrical power to perform the one or more wellbore operations such as the one or more environmental monitoring operations, the one or more fluid property monitoring operations, one or more actuation operations, and the like.

Figure 4:
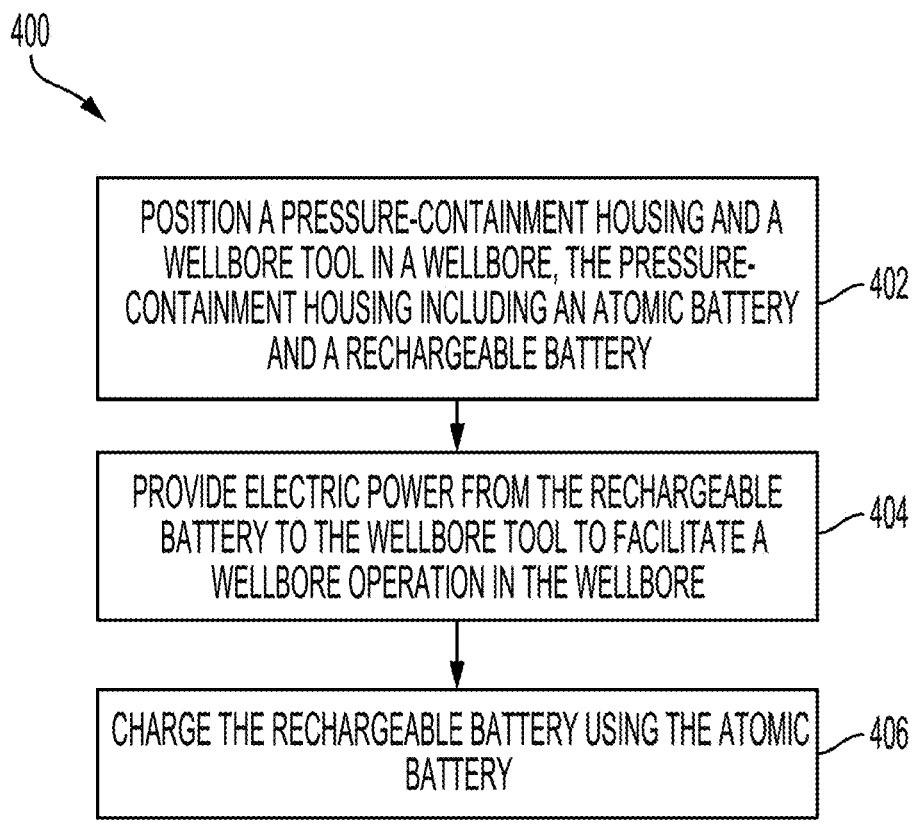
FIG. 4 is a flowchart of a process to use an atomic battery in a wellbore to charge a rechargeable battery according to one example of the present disclosure.

FIG. 4 is a flowchart of a process 400 to use an atomic battery 104 in a wellbore 102 to charge a rechargeable battery 202 according to one example of the present disclosure. At block 402, a pressure-containment housing 204 and a wellbore tool 108 are positioned downhole in a wellbore 102. The pressure-containment housing 204, the wellbore tool 108, or a combination thereof can be positioned in the wellbore 102 using a tubing 201 or via other suitable devices or techniques. In some examples, the pressure-containment housing 204 may include an atomic battery 104, a rechargeable battery 202, other suitable components (e.g., electrical cables, etc.), or any combination thereof. In a particular example, the pressure-containment housing 204, the wellbore tool 108, or a combination thereof can be coupled with, such as mechanically attached to, the tubing 201, and the tubing 201 can be positioned in the wellbore 102 using a winch, a crane, or other suitable device for lowering the tubing 201 into the wellbore.

Once the tubing 201 is positioned in the wellbore 102, the wellbore tool 108 may perform one or more wellbore operations. In some examples, the one or more wellbore operations can include one or more environmental monitoring operations, one or more fluid property monitoring operations, one or more actuation operations, and the like. The one or more environmental operations can involve monitoring a pressure, a temperature, vibrations, and the like in or around a wellbore 102. In some examples, the one or more environmental operations can be performed by one or more environmental sensors. The one or more fluid property monitoring operations can involve monitoring a composition of fluid in the wellbore 102, a viscosity of fluid in the wellbore 102, a velocity of fluid in the wellbore 102, and the like. The one or more fluid property monitoring operations can be performed by one or more fluid property sensors or gauges. The one or more actuation operations can involve fluid injection or production control, gas lift injection, packer setting or releasing, and the like. The one or more actuation operations can be performed by fluid control valves (e.g., inflow control valves, injection valves, etc.), a gas lift valve, a setting device, a release device, and the like.

At block 404, electrical power is provided to the wellbore tool 108 by the rechargeable battery 202. The rechargeable battery 202 may provide electrical power to the wellbore tool 108 facilitate the one or more wellbore operations such as the one or more environmental monitoring operations, the one or more fluid property monitoring operations, one or more actuation operations, and the like. For example, the wellbore tool 108 can be powered on, and the rechargeable battery 202 may convey electrical power to the wellbore tool 108 over one or more electrical cables or over a wireless electrical connection.

At block 406, the rechargeable battery 202 is recharged by the atomic battery 104. In some examples, recharging the rechargeable battery 202 may involve providing a trickle charge from the atomic battery 104 to the rechargeable battery 202. In other examples, recharging the rechargeable battery 202 may involve powering the rechargeable battery 202, or the wellbore tool 108, off to allow the atomic battery 104 to recharge the rechargeable battery 202 until a threshold charge is exceeded. The threshold charge may be a charge above which the rechargeable battery 202 can power the wellbore tool 108 to facilitate the one or more wellbore operations.

In some aspects, systems and methods for an atomic battery for a wellbore operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: one or more wellbore tools positionable in a wellbore to perform one or more wellbore operations; a pressure-containment housing positionable in the wellbore; and an atomic battery positionable in the pressure-containment housing and coupled with the one or more wellbore tools to provide continuous electrical power to the one or more wellbore tools to facilitate the one or more wellbore operations.

Example 2 is the system of example 1, wherein power is providable from the atomic battery continuously for a predetermined amount of time that ranges from approximately 10 years to approximately 50 years.

Example 3 is the system of example 1, wherein the atomic battery comprises a radioisotope battery that comprises tritium or Nickel-63.

Example 4 is the system of example 1, further comprising electrical equipment that couples the atomic battery to the one or more wellbore tools, and wherein a negligible amount of electrical power is consumable by the electrical equipment.

Example 5 is the system of example 1, wherein the one or more wellbore tools comprise a sensor, a valve, or a setting device, and wherein the one or more wellbore tools are usable to perform a completion operation or a production operation with respect to the wellbore.

Example 6 is the system of any of examples 1-5, wherein the continuous electrical power is providable by the atomic battery to the one or more wellbore tools to continuously operate the one or more wellbore tools for a life of the wellbore without the atomic battery being recharged.

Example 7 is the system of example 1, further comprising a rechargeable battery coupled with the atomic battery, wherein the rechargeable battery is trickle chargeable by the atomic battery.

Example 8 is a system comprising: one or more wellbore tools positionable in a wellbore to perform one or more wellbore operations; and an atomic battery positionable in a pressure-containment housing and coupled with the one or more wellbore tools to provide continuous electrical power to the one or more wellbore tools to facilitate the one or more wellbore operations.

Example 9 is the system of example 8, further comprising the pressure-containment housing, wherein power is providable from the atomic battery continuously for a predetermined amount of time that ranges from approximately 10 years to approximately 50 years without being recharged, and wherein the atomic battery comprises a radioisotope battery that comprises tritium or Nickel-63.

Example 10 is the system of example 8, further comprising one or more additional atomic batteries that are coupled with the atomic battery and that are positionable in the pressure-containment housing, wherein the one or more additional atomic batteries are coupled in series and in parallel with the atomic battery to provide continuous electrical power to the one or more wellbore tools.

Example 11 is the system of example 8, further comprising electrical equipment that couples the atomic battery to the one or more wellbore tools, and wherein a negligible amount of electrical power is consumable by the electrical equipment.

Example 12 is the system of example 8, wherein the one or more wellbore tools comprise a sensor, a valve, or a setting device, and wherein the one or more wellbore tools are usable to perform a completion operation or a production operation with respect to the wellbore.

Example 13 is the system of any of examples 8-12, wherein the continuous electrical power is providable by the atomic battery to the one or more wellbore tools to continuously operate the one or more wellbore tools for a life of the wellbore without the atomic battery being recharged.

Example 14 is the system of example 8, further comprising a rechargeable battery coupled with the atomic battery, wherein the rechargeable battery is trickle chargeable by the atomic battery.

Example 15 is a method comprising: positioning a pressure-containment housing and one or more wellbore tools downhole in a wellbore, the pressure-containment housing comprising an atomic battery that is electrically coupled with the one or more wellbore tools; and providing, by the atomic battery, continuous electrical power to the one or more wellbore tools to facilitate performing one or more wellbore operations in the wellbore.

Example 16 is the method of example 15, wherein providing the continuous electrical power comprises providing, by the atomic battery, electrical power to the one or more wellbore tools continuously for a predetermined amount of time that ranges from approximately 10 years to approximately 50 years.

Example 17 is the method of example 15, wherein the atomic battery comprises a radioisotope battery that comprises tritium or Nickel-63.

Example 18 is the method of example 15, wherein the one or more wellbore tools comprise a sensor, a valve, or a setting device, and wherein the one or more wellbore tools are used to perform a completion operation or a production operation with respect to the wellbore.

Example 19 is the method of any of examples 15-18, wherein providing the continuous electrical power comprises providing, by the atomic battery, the continuous electrical power to the one or more wellbore tools to continuously operate the one or more wellbore tools for a life of the wellbore without the atomic battery being recharged.

Example 20 is the method of example 15, wherein the atomic battery is coupled with a capacitor, and wherein the method further comprises trickle charging the capacitor with the atomic battery.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   one or more wellbore tools positionable in a wellbore to perform one or more wellbore operations;
   a pressure-containment housing positionable in the wellbore;
   an atomic battery positionable in the pressure-containment housing and wirelessly coupled with the one or more wellbore tools to wirelessly provide continuous electrical power to the one or more wellbore tools to facilitate the one or more wellbore operations, wherein the atomic battery comprises a thermal atomic battery; and
   a rechargeable battery wirelessly coupled with the atomic battery, wherein the rechargeable battery is trickle chargeable by the atomic battery via wireless power transmission.

2. The system of claim 1, wherein power is providable from the atomic battery continuously for a predetermined amount of time that ranges from approximately 10 years to approximately 50 years.

3. The system of claim 1, wherein the atomic battery comprises a radioisotope battery that comprises tritium or Nickel-63.

4. The system of claim 1, further comprising electrical equipment that couples the atomic battery to the one or more wellbore tools, and wherein a negligible amount of electrical power is consumable by the electrical equipment.

5. The system of claim 1, wherein the one or more wellbore tools comprise a sensor, a valve, or a setting device, and wherein the one or more wellbore tools are usable to perform a completion operation or a production operation with respect to the wellbore.

6. The system of claim 5, wherein the continuous electrical power is providable by the atomic battery to the one or more wellbore tools to continuously operate the one or more wellbore tools for a life of the wellbore without the atomic battery being recharged.

7. A system comprising:
   one or more wellbore tools positionable in a wellbore to perform one or more wellbore operations;
   an atomic battery positionable in a pressure-containment housing and wirelessly coupled with the one or more wellbore tools to wirelessly provide continuous electrical power to the one or more wellbore tools to facilitate the one or more wellbore operations, wherein the atomic battery comprises a thermal atomic battery; and
   a rechargeable battery wirelessly coupled with the atomic battery, wherein the rechargeable battery is trickle chargeable by the atomic battery via wireless power transmission.

8. The system of claim 7, further comprising the pressure-containment housing, wherein power is providable from the atomic battery continuously for a predetermined amount of time that ranges from approximately 10 years to approximately 50 years without being recharged, and wherein the atomic battery comprises a radioisotope battery that comprises tritium or Nickel-63.

9. The system of claim 7, further comprising one or more additional atomic batteries that are coupled with the atomic battery and that are positionable in the pressure-containment housing, wherein the one or more additional atomic batteries are coupled in series and in parallel with the atomic battery to provide continuous electrical power to the one or more wellbore tools.

10. The system of claim 7, further comprising electrical equipment that couples the atomic battery to the one or more wellbore tools, and wherein a negligible amount of electrical power is consumable by the electrical equipment.

11. The system of claim 7, wherein the one or more wellbore tools comprise a sensor, a valve, or a setting device, and wherein the one or more wellbore tools are usable to perform a completion operation or a production operation with respect to the wellbore.

12. The system of claim 11, wherein the continuous electrical power is providable by the atomic battery to the one or more wellbore tools to continuously operate the one or more wellbore tools for a life of the wellbore without the atomic battery being recharged.

13. A method comprising:
positioning a pressure-containment housing and one or more wellbore tools downhole in a wellbore, the pressure-containment housing comprising an atomic battery that is wirelessly, electrically coupled with the one or more wellbore tools, wherein the atomic battery comprises a thermal atomic battery;
providing, by the atomic battery, continuous, wireless electrical power to the one or more wellbore tools to facilitate performing one or more wellbore operations in the wellbore; and
trickle charging, by wireless power transmission of the atomic battery, a rechargeable battery via a wireless coupling between the rechargeable battery and the atomic battery.

14. The method of claim 13, wherein providing the continuous, wireless electrical power comprises providing, by the atomic battery, electrical power to the one or more wellbore tools continuously for a predetermined amount of time that ranges from approximately 10 years to approximately 50 years.

15. The method of claim 13, wherein the atomic battery comprises a radioisotope battery that comprises tritium or Nickel-63.

16. The method of claim 13, wherein the one or more wellbore tools comprise a sensor, a valve, or a setting device, and wherein the one or more wellbore tools are used to perform a completion operation or a production operation with respect to the wellbore.

17. The method of claim 16, wherein providing the continuous, wireless electrical power comprises providing, by the atomic battery, the continuous, wireless electrical power to the one or more wellbore tools to continuously operate the one or more wellbore tools for a life of the wellbore without the atomic battery being recharged.

* * * * *